United States Patent
Watanabe

(10) Patent No.: US 7,889,624 B2
(45) Date of Patent: Feb. 15, 2011

(54) OPTICAL INFORMATION RECORDING-REPRODUCTION APPARATUS

(75) Inventor: Fumito Watanabe, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 423 days.

(21) Appl. No.: 12/028,985

(22) Filed: Feb. 11, 2008

(65) Prior Publication Data

US 2008/0198728 A1  Aug. 21, 2008

(30) Foreign Application Priority Data

Feb. 21, 2007 (JP) .............................. 2007-040603

(51) Int. Cl.
*G11B 7/00* (2006.01)
(52) U.S. Cl. ................. 369/118; 369/112.01; 369/44.24
(58) Field of Classification Search .............. 369/44.24, 369/112.01, 118
See application file for complete search history.

(56) References Cited

U.S. PATENT DOCUMENTS

| 6,738,323 B1* | 5/2004 | Imanishi et al. .......... 369/44.32 |
| 2005/0180283 A1* | 8/2005 | Ishimoto et al. .......... 369/53.19 |
| 2005/0190666 A1 | 9/2005 | Ishimoto |
| 2006/0256695 A1* | 11/2006 | Saito et al. ............. 369/112.01 |
| 2007/0217300 A1* | 9/2007 | Koyama et al. .......... 369/44.23 |
| 2008/0089208 A1* | 4/2008 | Verschuren ............ 369/112.23 |

FOREIGN PATENT DOCUMENTS

JP 2005-209246 8/2005

OTHER PUBLICATIONS

Coen A. Verschuren, et al., "Near Field Recording on First-Surface Write-Once Media with a NA=1.9 Solid Immersion Lens", Japanese Journal of Applied Physics, vol. 44, No. 5B, 2005, pp. 3564-3567.
F. Zijp, et al., "Near Field Read-Out of a 50 GB First-Surface Disk with NA=1.9 and a Proposal for a Cover-Layer Incident, Dual-Layer Near Field System", Optical Data Storage 2004, Proceedings of SPIE, vol. 5380, 2004, pp. 209-223.

* cited by examiner

*Primary Examiner*—Adam R Giesy
(74) *Attorney, Agent, or Firm*—Fitzpatrick, Cella, Harper & Scinto

(57) ABSTRACT

An optical information recording-reproducing apparatus for effecting at least one of recording of information on and reproducing of information from an optical recording medium. A light source emits a light beam. An objective lens and a solid immersion lens receive the light beam from the light source and approach the optical recording medium at a predetermined speed to focus the light beam onto the optical recording medium. An aperture element collects a portion of the light beam that is reflected by the recording medium, in which the portion of the light beam has a diameter that corresponds to an effective aperture number of the objective lens and the solid immersion lens of less than one. A detecting element detects the portion of the light beam collected by the aperture element and produces an output signal. A speed-generating circuit receives the output signal from the detecting element and determines the speed of approach of the solid immersion lens to the recording medium, in accordance with the output signal, and produces an output. A driver circuit drives the objective lens and the solid immersion lens and reduces the speed of approach of the solid immersion lens, in accordance with the output from the speed-generating circuit.

22 Claims, 14 Drawing Sheets

OPTICAL INFORMATION RECORDING-REPRODUCTION APPARATUS

This application claims the benefit of Japanese Patent Application No. 2007-040603, filed Feb. 21, 2007, which is hereby incorporated by reference herein in its entirety.

BACKGROUND OF THE INVENTION

1. Field of the Invention

The present invention relates to an optical information recording-reproducing apparatus, which employs a solid immersion lens (hereafter referred to as an "SIL") for recording information on or reproducing information from a recording medium. In particular, the present invention relates to servo-control of a gap or focus.

2. Description of the Related Art

To increase the recording density of an optical disk, generally, the light spot diameter on the recording face of the optical disk is made smaller, by shortening the wavelength of light used for recording and reproduction, and by increasing the numerical aperture (NA) of the objective lens. Conventionally, a so-called SIL is employed, and a front lens of an objective lens system is brought close to the recording face of a recording medium, to a distance of a fraction (e.g., one-half (½) or less) of the recording light wavelength, to increase the NA to be higher than one in the air.

A method for this is disclosed in detail, for example, in a document: Japan Journal Applied Physics, vol. 44, (2005) pages 3564-3567, "Near Field Recording on First-Surface Write-Once Media with a NA=1.9 Solid Immersion Lens".

This method is also described in detail in a document: Optical Data Storage 2004, Proceedings of SPIE, vol. 5380 (2004), "Near Field Read-Out of a 50 GB First-Surface Disk with NA=1.9 and a Proposal for Cover-Layer Incident, Dual-Layer Near Field System", and so forth.

The prior art techniques are described below with reference to FIGS. 11 to 14. First, the constitution of the optical pickup for the near-field recording in the first document above is described with reference to FIG. 11. A light beam having a wavelength of 405 nm emitted from semiconductor laser 1, a light source, is converted into a parallel beam by collimator lens 2, and is introduced to beam-shaping prism 3, to make the light quantity distribution isotropic.

The light beam is further allowed to pass through non-polarized light beam splitter (NBS) 4, polarized beam splitter (PBS) 7, and quarter-wave plate (QWP) 8, successively. The light beam, which is linearly polarized, is converted by the quarter-wave plate 8 to a circularly polarized light beam. A portion of the light beam reflected by non-polarized beam splitter (NBS) 4 is introduced to photodetector (LPC-PD) 6 for control of the emission power of semiconductor laser 1.

The light beam, having passed through quarter-wave plate 8, is introduced to expander lens system 9. Expander lens system 9 serves to correct spherical aberration caused in the objective lens or SIL, as mentioned later, and is constituted of two lenses: the distance between the two lenses is adjustable, to correct the spherical aberration. The light beam from expander lens system 9 is introduced to rear objective lens 10 of the objecting lens system.

The objective lens system is constituted of rear objective lens 10 and SIL (front objective lens) 11, and is mounted on a two-axis actuator (not shown in the drawing) to drive the two-lens system in the focusing and tracking directions. Hereafter, rear objective lens 10 is simply referred to as an objective lens, and the front objective lens is referred to as SIL 11.

FIG. 12 illustrates the convergence of the light beam by objective lens 10 and focusing to the bottom face of hemispherical lens, SIL 11. The light beam is introduced perpendicularly to the spherical face of SIL 11, and is focused on the bottom face through the same path as that in the absence of the hemispherical SIL. This achieves the effect of shortening the wavelength corresponding to the refractive index of SIL 11 and achieves an effect of a decrease of the light spot diameter.

Specifically, the light spot on the recording face of the optical disk 12 corresponds to N×NA, where N denotes the refractive index of the hemisphere lens and NA denotes the numerical aperture of objective lens 10. For example, a combination of objective lens 10 of NA=0.7 with hemispherical lens SIL of N=2 gives an effective NA (NAeff) of 1.4. The tolerable thickness error of SIL 11 is about 10 μm. Therefore, the device can be mass-produced readily.

The recording and reproduction with a light spot having a diameter corresponding to NAeff can be conducted by action of evanescent light from the bottom face of the SIL onto the recording face, only when the distance between the SIL bottom face and optical disk 12 is not longer than a fraction of the wavelength 405 nm of the light source, for example, in a short distance of 100 nm or less. To keep this distance, the gap is servo-controlled, as described later.

The optical system for the return path is described with reference again to FIG. 11. The light beam reflected by optical disk 12 becomes a reversed circularly polarized light beam, and is introduced to SIL 11 and objective lens 10, whereby the light is further converted to a parallel light beam. Then, the light beam is allowed to pass through expander lens system 9, and quarter-wave plate 8. Thereby, the light beam is converted to a linearly polarized light beam polarized in the direction perpendicular to that in the light beam projection path. This polarized light beam is reflected by PBS 7.

The light beam reflected by PBS 7 is allowed to pass through halfwave plate (HWP) 13 to turn the polarization plane by 45°. The S-polarized light component of the light beam is reflected by polarized light beam splitter 14 to pass lens 15, and is focused on photodetector-1 (PD-1) 16. From the optical signal detected by photodetector 1 (PD-1) 16, the information on optical disk 12 is reproduced as an RF output 17 by an information reproduction circuit (not shown in the drawing).

On the other hand, the P-polarized light component of the light beam, which has a polarization plane turned by 45° by halfwave plate (HWP) 13, is allowed to pass hrough polarized light beam splitter (PBS) 14, and is reflected by non-polarized light beam splitter 18. The reflected light beam is allowed to pass lens 19, and is focused on two-division photodetector-2 (PD2) 20. From the signal detected by the two-division photodetector-2 (PD2) 20, tracking error signal 21 is generated by a tracking error-detecting circuit (not shown in the drawing). According to tracking error signal 21, the tracking is servo-controlled by a tracking servo circuit (not shown in the drawing).

Of the light beam reflected by the bottom of SIL 11, the portion not totally reflected, corresponding to NAeff<1, is also reflected as circularly polarized light rotating in a direction reverse to the incident light beam, similar to the reflected light from optical disk 12. In the totally reflected light beam corresponding to NAeff≧1, a phase difference δ, shown by the equation below, is caused between the P-polarized light component and the S-polarized component, and the circularly polarized light beam is deformed to an elliptically polarized light beam.

$$\tan(\delta/2) = \cos\theta i \times \sqrt{(N^2 \times \sin^2\theta i - 1)/(N \times \sin^2\theta i)} \quad (1)$$

Therefore, the reflected light beam after passing through a quarter-wave plate contains a polarized light component of the same polarization direction as that of the incident light beam. This polarized light component is allowed to pass through PBS 7, reflected by NBS 4, allowed to pass through lens 26, and is focused on photodetector-3 (PD3) 27. The light quantity of this light beam decreases monotonically with the decrease of the distance between the SIL bottom face and the optical disk in the near-field region. Therefore, gap error signal 28 can be obtained from the signal detected by photodetector-3 (PD3) 27.

The distance between the SIL bottom face and the optical disk can be kept at an intended distance of not more than 100 nm by servo-control of the gap within a prescribed threshold. The servo-control of the gap is described in detail in the first document discussed above (that is, the "Near Field Recording on First-Surface Write-One Media with a NA=1.9 Solid Immersion Lens" article). Since this light beam is not modulated by the information recorded on the optical disk, the gap error signal can be obtained stably, regardless of the presence or absence of the recorded information.

In the servo-control of the gap, the overshoot should be less than the above-mentioned 100 nm. An overshoot of more than 100 nm will cause collision of the SIL against the optical disk. This will damage the SIL and the optical disk. To prevent the overshoot, as one method, the speed of approach of the SIL to the optical disk in the servo-control may be lowered. However, the lower approaching speed requires a longer time for the servo-control, and is not desirable, practically.

Japanese Patent Application Laid-Open No. 2005-209246, for example, discloses an apparatus to solve this problem. FIG. 13 illustrates the constitution of this apparatus. In FIG. 13, to start the servo-control of the gap, approach speed-generating circuit 108 outputs a drive signal to actuator driver circuit 106, to bring the object lens and SIL of optical pickup 102 close to optical disk 101. Optical pickup 102 in FIG. 13 may have a constitution similar to the optical system illustrated in FIGS. 11 and 12. Optical disk 101 in FIG. 13 corresponds to the optical disk 12 shown in FIG. 11.

During approach of SIL 11 to optical disk 101, a gap error signal generated by gap error-generating circuit 104 is input to comparator 107. Comparator 107 outputs a signal LOW to meet a gap error signal higher than a prescribed level Vth, and a signal HIGH to meet a gap error signal lower than the prescribed level Vth to switch 109.

When the SIL is detected to have approached close to the optical disk in a near field state, comparator 107 outputs a signal HIGH to turn on switch 109. Thereby, servo-control of the gap is started. In this process, the gap error signal is transmitted through phase compensation circuit 105, switch 109, and adder 130, to actuator diver circuit 106.

During the transition from the far field state to the near field state, approach speed-generating circuit 108 generates a signal in a waveform 142 shown in FIG. 14. The comparator outputs a signal in a waveform 141. Approach speed-generating circuit 108 is set, preliminarily, to produce output 142 to keep the voltage constant after the time t1 when the gap error signal comes equal to or lower than a prescribed level Vth. In such a manner, the actuator is set to generate the approach voltage at a constant level at the start of the servo-control of the gap. Thereby, the initial speed of the SIL at the start of the servo-control of the gap is controlled to be nearly zero, to servo-control the gap stably.

In the method of the aforementioned Japanese Patent Application Laid-Open No. 2005-209246, the approach voltage is set to control the speed of the SIL to be nearly zero at the start of the servo-control of the gap. However, in the servo-control with optical disk 101 rotated by spindle 103, it is difficult to keep the SIL speed to be nearly zero at the start of the servo-control, in consideration of swinging of the face of optical disk 101 and spindle 103.

With a disk face swinging, for example, the gap can come to a near field state before the time t1, or before the approach voltage comes to a prescribed constant voltage. In such a case, the non-constant output voltage of approach voltage-generating circuit 108 can start the servo-control of the gap in a stage of the approaching speed of not zero, or in a state of a high speed of the SIL relative to the optical disk face.

FIGS. 6A to 6D illustrate the servo-control of the gap started when the approach voltage is not constant in a ramp state and the gap error signal 62 comes to be lower than a prescribed level.

In the upper graph in FIG. 6A, the abscissa axis represents the time, and the ordinate axis represents the size of the gap. In the lower graph of FIG. 6A, the abscissa axis represents the time, and the ordinate axis represents the level of the actuator-driving signal 61 and the level of the gap error signal 62.

In the upper graph of FIG. 6A, the size of the gap is shown to vary in a sine curve shape before a start of the servo-control of the gap. This variation of the gap is caused by a swing of the optical disk, in spite of the movement of the SIL at a constant speed. Further, after the start of the servo-control of the gap, the actuator-driving signal is produced in a sine curve shape, owing to the gap servo-control following the face swing of the optical disk. Incidentally, numeral 63 in FIGS. 6A and 6C denotes the ON-OFF change of the loop; numeral 64 in FIG. 6B denotes the collision; numeral 65 in FIG. 6D denotes no collision; and numeral 66 in FIG. 6C denotes the change of speed.

In the servo-control method of Japanese Patent Application Laid-Open No. 2005-209246, the gradient of the ramped actuator-driving signal is constant before the gap error signal comes lower than a prescribed level, which is affected by the face swing. The SIL is allowed to approach the optical disk at a constant speed according to a ramp-shaped function, and the approach movement is stopped, and the servo-control of the gap is started at the time when the gap error signal comes to a prescribed level. According to this method, the gap size can become zero, or less, immediately after a start of the servo-control. This signifies collision in this method, the speed of the approach should be controlled to be sufficiently low. Further, the gap size for the prescribed level Vth of the gap error signal is as small as about 100 nm or less. Therefore, overshoot of 100 nm or more will cause collision of the SIL against the optical disk. This is disadvantageous.

SUMMARY OF THE INVENTION

The present invention intends to provide an optical recording-reproduction apparatus, which enables a high speed approach of the SIL to the optical recording medium without collision of the SIL against the optical recording medium by stable servo-control of the gap in a short time.

The present invention is directed to an optical information recording-reproduction apparatus comprising a light source, an object lens and an SIL (solid immersion lens) for focusing a light beam from the light source on an optical recording medium, an aperture element for collecting a part of the light beam reflected by an optical recording medium, corresponding to the effective aperture number of the objective lens and the SIL of less than one, a detecting element for detecting the part of the light beam from the aperture element corresponding to the effective aperture number of less than one, a speed-generating circuit for reducing the speed of approach of the SIL to the recording medium in accordance with the level of the signal detected by the detecting element, and a driver circuit for driving the objective lens and the SIL in accordance with an output from the speed-generating circuit.

In the optical information recording-reproducing apparatus, servo-control of the gap can be started after the driver circuit starts reduction of the speed of approach in accordance with a gap error signal derived from the reflected light beam from the recording medium.

In the optical information recording-reproduction apparatus, servo-control of the focus can be started after the driver circuit starts a reduction in the speed of approach in accordance with a focus error signal derived from the output of the detecting element. In the optical information recording-reproduction, servo-control of the gap can be started, after the servo-control of the focus is completed, in accordance with a gap error signal derived from the reflected light beam from the recording medium.

According to the present invention, for starting servo-control of the gap, a signal is employed, which is generated by a light beam corresponding to effective aperture number of less than one of the SIL. Thereby, the timing can be obtained exactly regarding separation of the SIL from the optical recording medium before the start of the servo-control. Therefore, the speed of the approach of the SIL to the optical disk can be decreased at that timing, and the servo-control can be started stably, in a short time.

Further features of the present invention will become apparent from the following description of exemplary embodiments, with reference to the attached drawings.

DESCRIPTION OF THE EMBODIMENTS

The best mode for conducting the present invention is described below, with reference to the drawings.

First Embodiment

Figure 1:
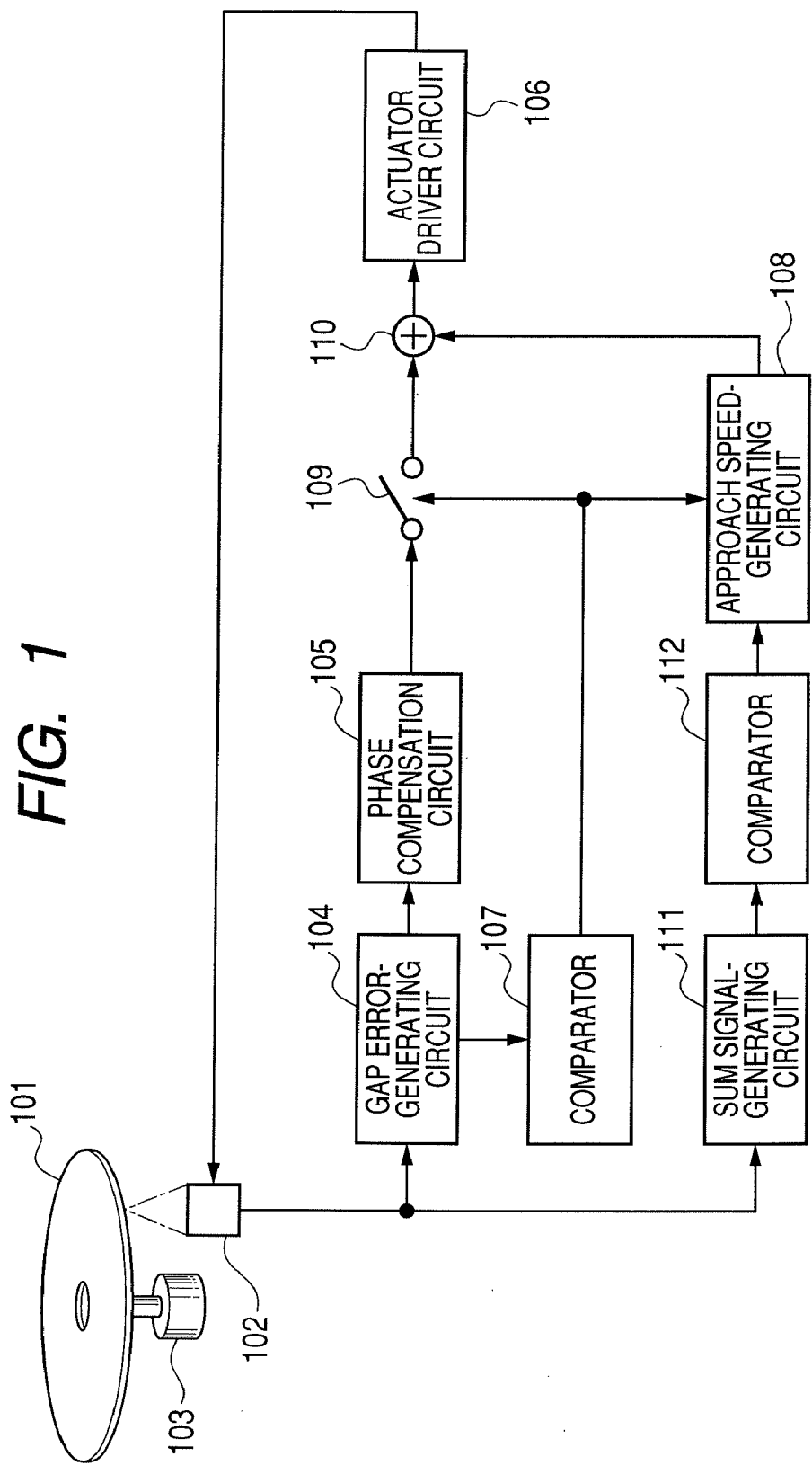
FIG. 1 is a block diagram of a First Embodiment of the optical information recording-reproduction apparatus of the present invention.
Figure 2:
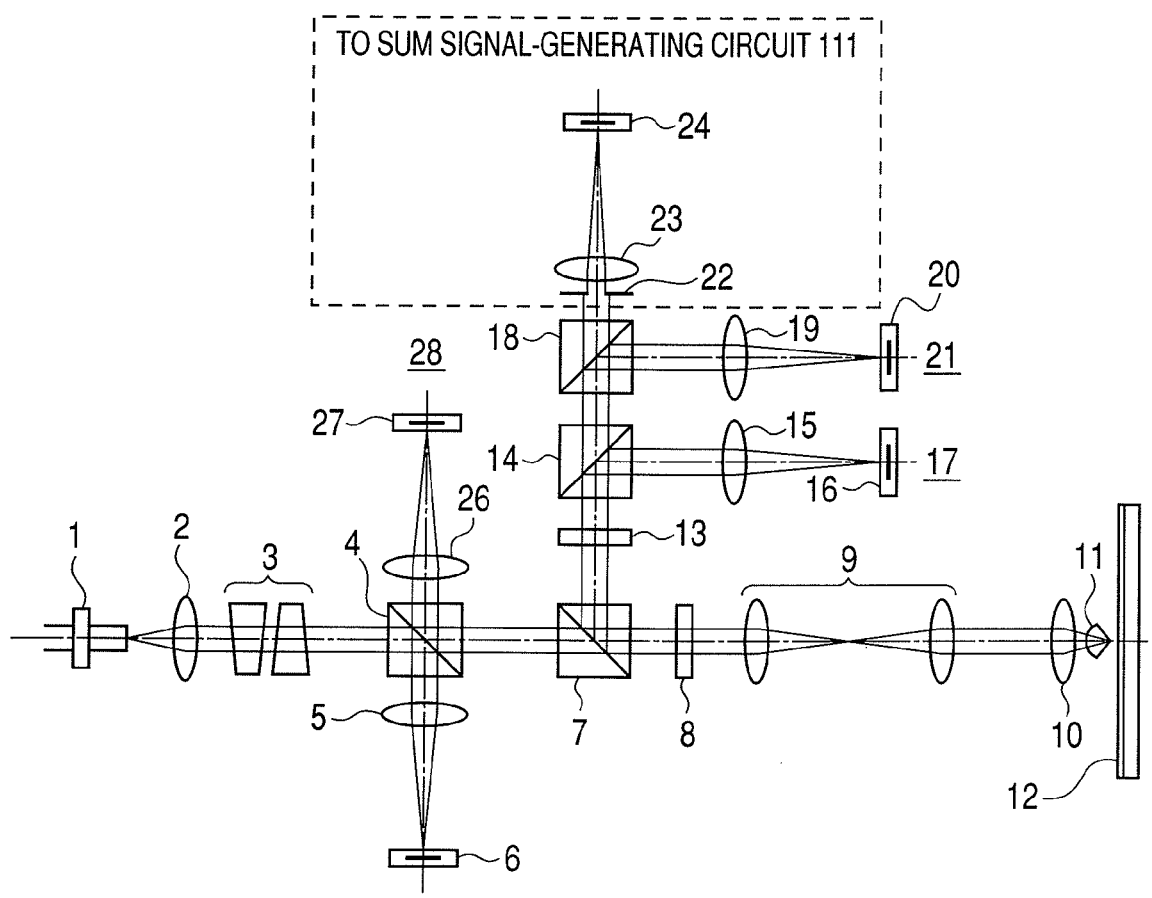
FIG. 2 illustrates a constitution of the optical pickup system of the First Embodiment of the present invention.
Figure 13:
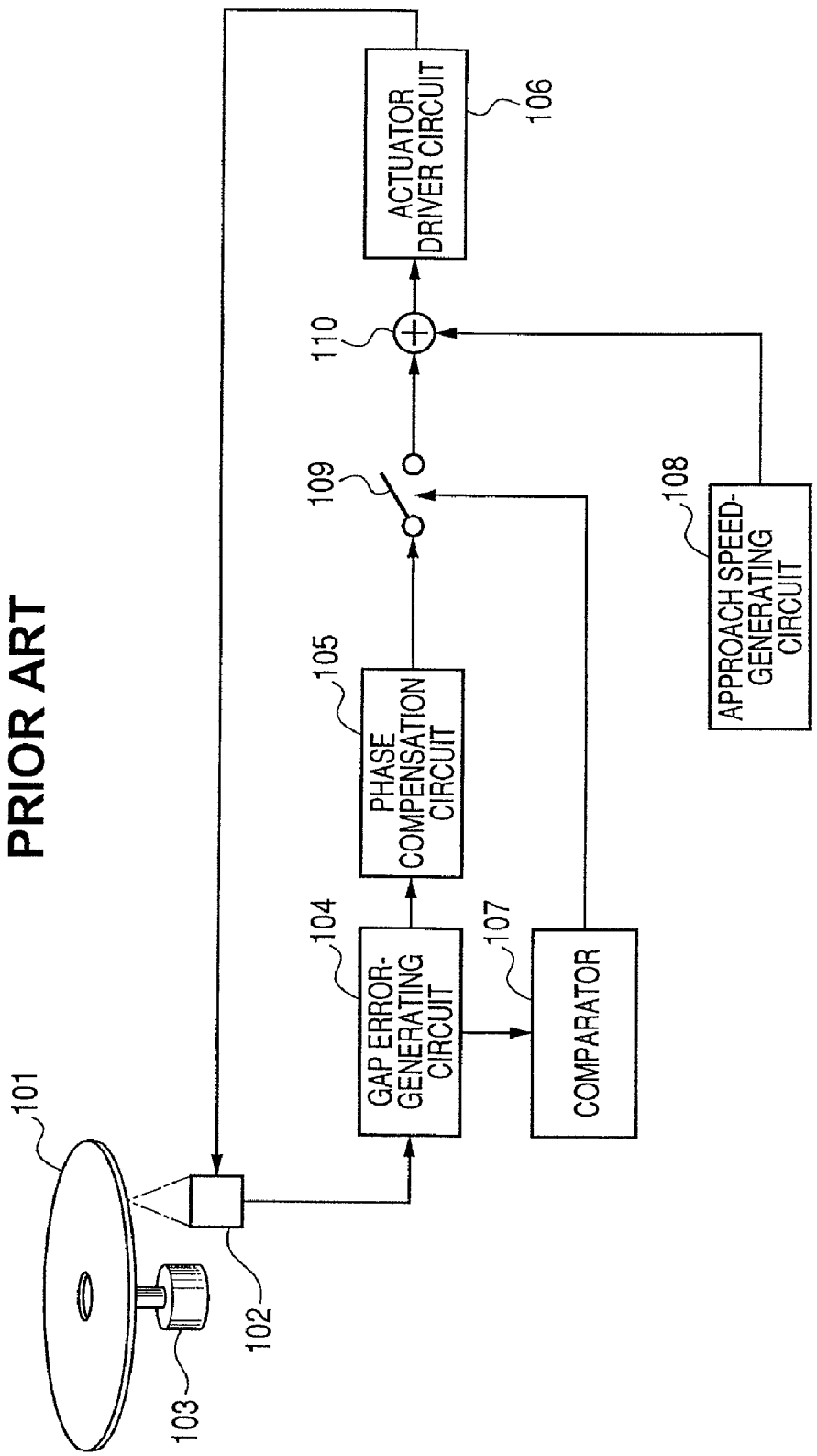
FIG. 13 is a block diagram of a conventional optical information recording-reproduction apparatus employing an SIL.
Figure 14:
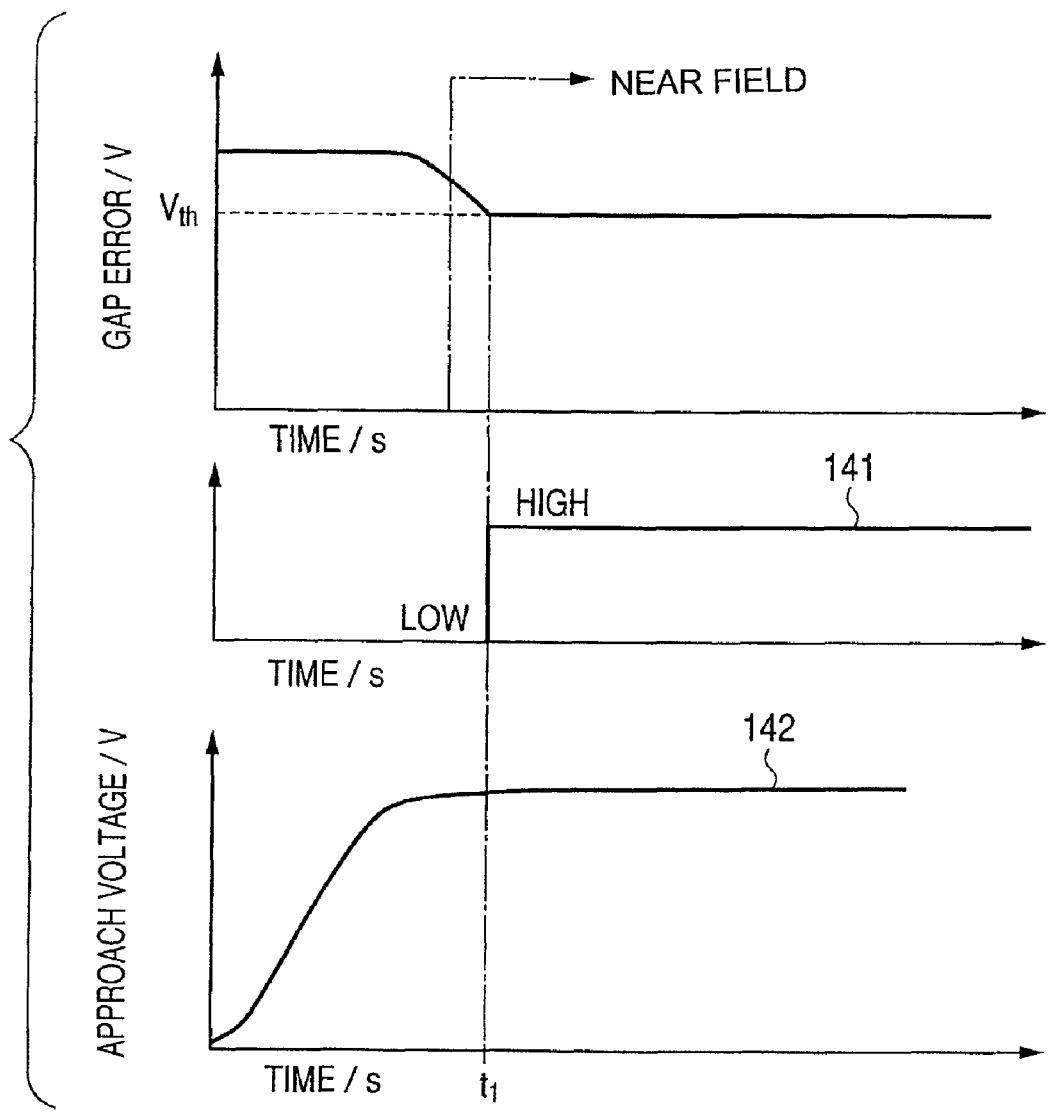
FIG. 14 is a timing chart for starting the servo-control of the gap in a conventional optical information recording-reproduction apparatus.

FIG. 1 is a block diagram of a First Embodiment of the optical information recording-reproduction apparatus of the present invention. In FIG. 1, the same symbols are used for denoting corresponding items as in FIG. 13, describing the prior art technique. FIG. 2 illustrates a constitution of the optical system (optical pickup of this Embodiment). FIG. 2 is different, in the portion surrounded by a broken line, from FIG. 13, illustrating the prior art.

The optical recording medium (optical disk 12) in FIG. 2 corresponds to optical disk 101 in FIG. 1. In FIG. 1, omitted are the circuit for recording information on the optical disk, the circuit for reproduction of information, the circuits for servo-control of focusing and tracking, and the circuit and mechanism for control of optical disk rotation. The same omission is also made in the Embodiment described later. (The focus servo circuit is not omitted in the drawings in the Embodiments described later.)

First, the constitution of the optical system is described with reference to FIG. 2. The light beam emitted from the light source (semiconductor laser 1) is reflected by optical disk 12, and is transmitted through PBS 7 and polarized light beam splitter 18. This light beam, which has passed through polarized light beam splitter 18, passes through aperture element 22. Thereby, the peripheral portion of the light beam is intercepted. Thereafter, the light beam is focused through sensor lens 23 on photodetector-4 (PD4) 24. The output of photodetector-4 (PD4) 24 is introduced to sum signal-generating circuit 111, shown in FIG. 1, to generate a sum signal. Photodetector-4 (PD4) 24 detects, from the light beam reflected by the recording layer of optical disk 101, only the portion of the light beam corresponding to the effective aperture number (NAeff) of less than one of SIL 11.

Figure 3:
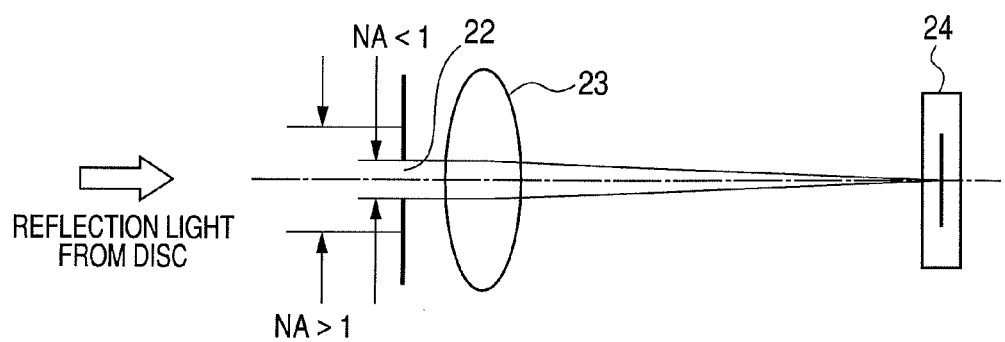
FIG. 3 illustrates an optical means for detecting a sum signal.

The portion surrounded by the broken line of the optical system in FIG. 2 is described in detail with reference to FIG. 3 and FIGS. 4A and 4B. In FIG. 3, the light beam reflected by the optical disk has NA=1.4 (NA>1) at the periphery portion of the pupil. Aperture element 22 allows the center portion of the light beam of NA<1 (e.g., NA=0.85) to pass through and intercepts the peripheral portion of NA>1 of the light beam. The NA of the transmitted light beam is limited to be smaller than NA=1 by 10% to intercept effectively the peripheral portion of the light beam of NA>1 in consideration of a possible deviation of objective lens 10 and SIL 11, resulting from decentering of the optical disk.

Figure 4A:
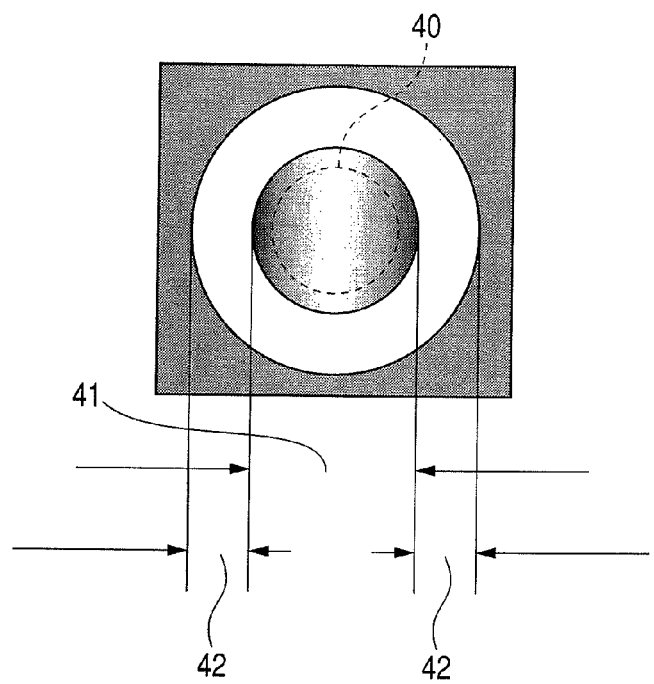
FIGS. 4A and 4B illustrate the relations among the light beam of NA<1, the sum signal, and the gap error signal.
Figure 4B:
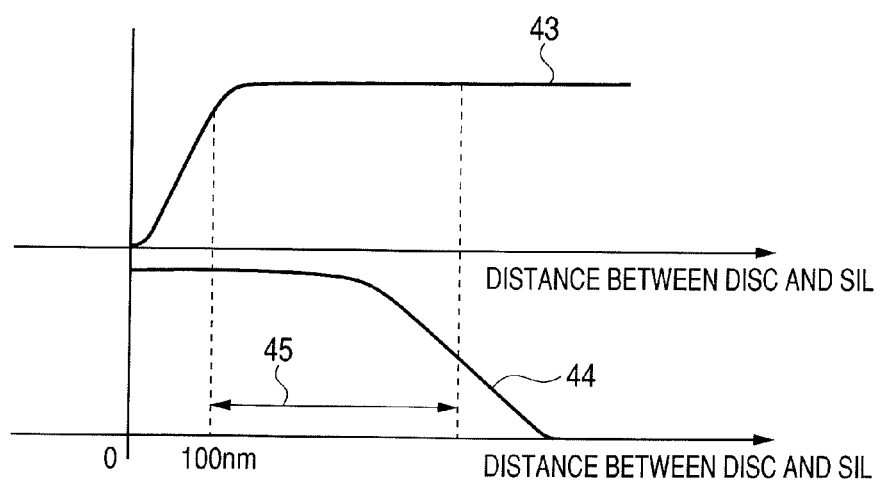

FIGS. 4A and 4B illustrate schematically the relations of the light quantity distribution in the pupil, the gap error signal, and the sum signal from light beam 41 of NA<1. Annulus portion 42 of NA>1 contains the light reflected by the bottom of the SIL much, and can cause noise in the sum signal. Therefore, the light beam of NA<1, (e.g., NA<0.85 inside the broken line of FIGS. 4A and 4B) is allowed to pass through aperture element 22.

The light beam of NA<1 gives sum signal 44, which is a reflected light beam from the recording layer of optical disk 101. Gap error signal 43 is generated by gap error-generating circuit 104 in FIG. 1, according to the light signal introduced to photodetector (PD3) 27 in FIG. 2.

The gap error signal will come to decrease when the distance 45 of SIL 11 from the optical disk surface decreases to about 100 nm or less, as illustrated in FIGS. 4A and 4B. In contrast, the sum signal generated from the light beam of NA<1 increases at the distance of about 1 μm between the SIL 11 and optical disk 101 during time 53 from t1 to t2 (in approach of the SIL to the optical disk).

The servo-control of the gap employing the sum signal of the present invention is described below in detail with reference to FIG. 1 and FIG. 5. In the same manner as in the prior art technique mentioned before, in starting the servo-control of the gap, a ramp-shaped driving signal is output from approach speed-generating circuit 108, to start driving of objective lens 10 and SIL 11 in integration to approach optical disk 101. Objective lens 10 and SIL 11 are mounted in integration on a two-axis actuator and are driven integrally in the focusing direction and the tracking direction.

During the approach, the sum signal derived from the light beam of NA<1 is input to comparator 112. The output 54 of comparator 112 is switched from LOW to HIGH when the signal level of sum signal 52 becomes higher than a prescribed level SUMth, as shown in FIG. 5. The HIGH level of output 53 from comparator 112 (at time t1 in FIG. 5), approaching speed-generating circuit 108, lowers the approaching speed of objective lens 10 and SIL 11 toward the optical disk.

With the driving signal in a form of a ramp function, the approach speed is lowered by decreasing the gradient. The approach movement is further continued at the lowered approach speed. During the approach movement, gap error signal 51 is input to comparator 107. At the time when gap error signal 51 becomes lower than a prescribed level GEth2, output level 55 from comparator 107 is switched from LOW to HIGH (time t2 in FIG. 5).

Figure 5:
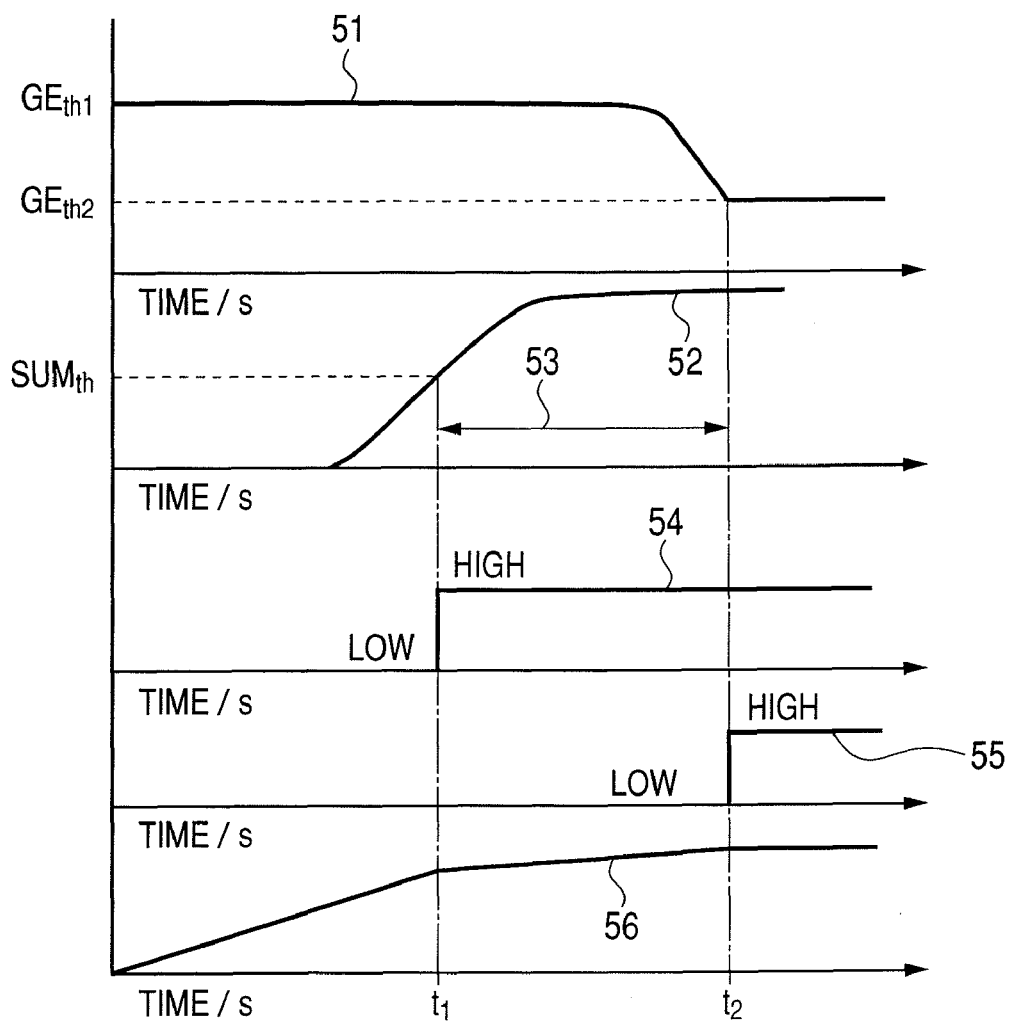
FIG. 5 is a timing chart for starting the servo-control of the gap in the First Embodiment.

At the time t2 in FIG. 5, output 56 from approach speed-generating circuit 108 is fixed and, simultaneously, switch 109 is turned on, to start a normal servo-loop control. Thus, phase compensation circuit 105 compensates for the phase of the gap error signal and drives the actuator in accordance with the output. In this process, the output of phase compensation circuit 105 is transmitted through switch 109 and adder 110, to actuator driver circuit 106, to drive the two-axis actuator (not shown in the drawing) corresponding to the output.

Approach speed-generating circuit 108 and actuator driver circuit 106 constitute the driving means for bringing SIL 11 near to optical disk 101. Approach speed-generating circuit 108 constitutes a means for lowering the speed of the SIL, at the time when the detection signal from the detection means becomes higher than a prescribed level in the SIL driving.

Figure 6A:
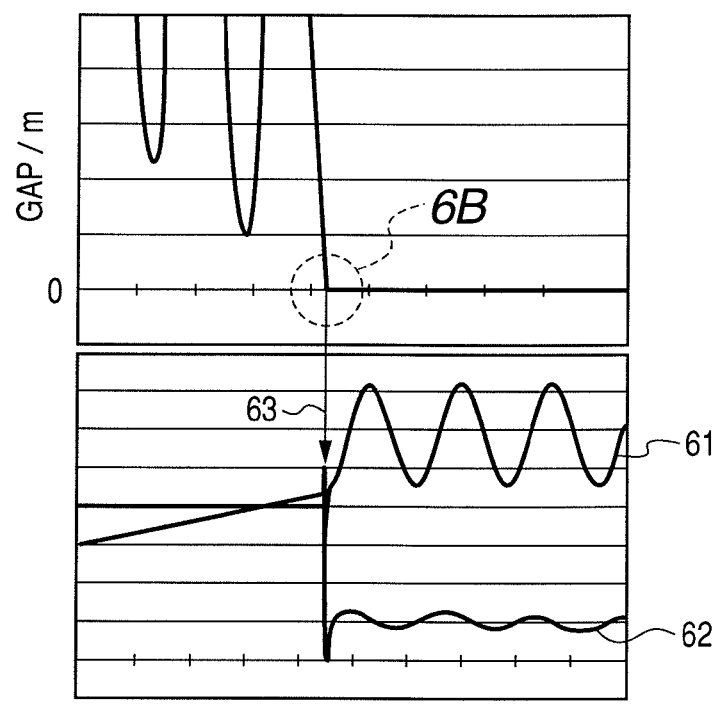
FIGS. 6A, 6B, 6C and 6D are drawings for comparing the effect of servo-control of the gap of the present invention with that of a prior art technique.
Figure 6B:
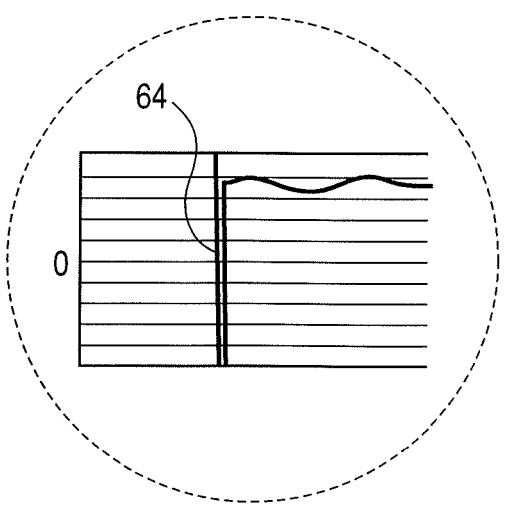
Figure 6C:
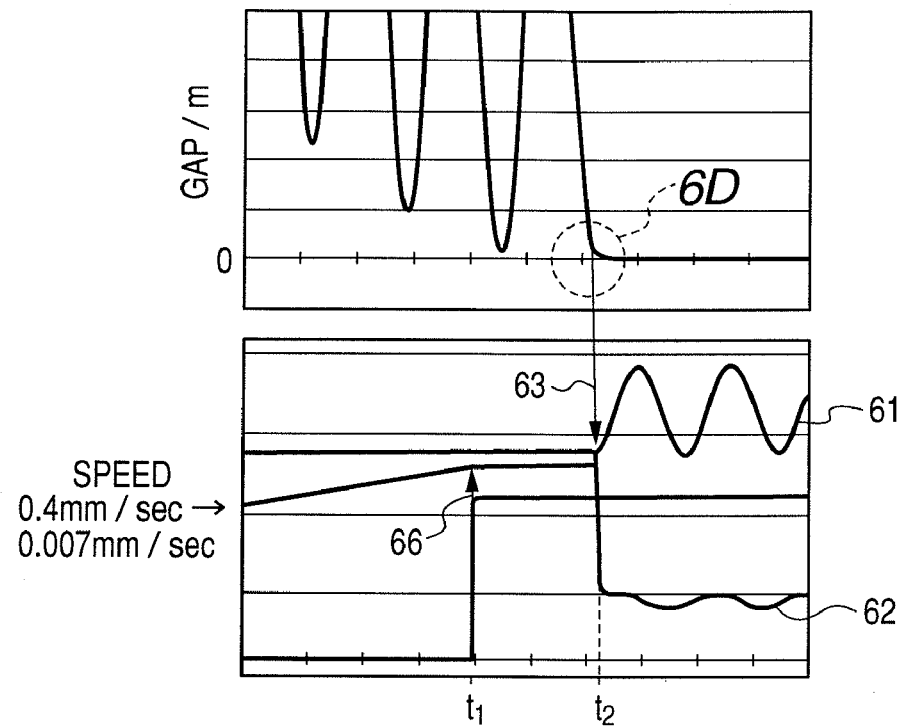
Figure 6D:
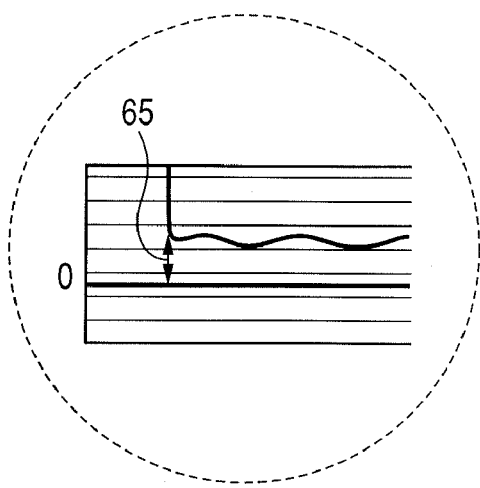

The effect of the servo-control is described with reference to FIG. 6B. By the servo-control according to the present invention, the SIL may be allowed to approach the optical disk at a high speed, until the sum signal exceeds the intended level, and the speed is lowered sufficiently at time t1 (in FIG. 5), and the servo-control is started at time t2. Thereby, the size of the gap will not become zero, or less, like that illustrated in FIG. 6C, not to cause collision of the SIL against the optical disk.

Specifically, the overshoot at the start of the servo-control can be reduced to 10 nm or less to surely avoid collision of the SIL against the optical disk. Moreover, the SIL can be brought close to the optical disk at a high speed, by the time t1, to shorten the time for a start of the servo-control.

In the present invention as described above, the servo-control of the gap is conducted by use of a sum signal derived from a light beam of NA<1. That is, at the start of the servo-control of the gap, use of the sum signal derived from the light beam of NA<1, whereby the timing of lowering the speed of approach of the SIL can be decided, to start servo-control of the gap stably in a short time.

Second Embodiment

Figure 7:
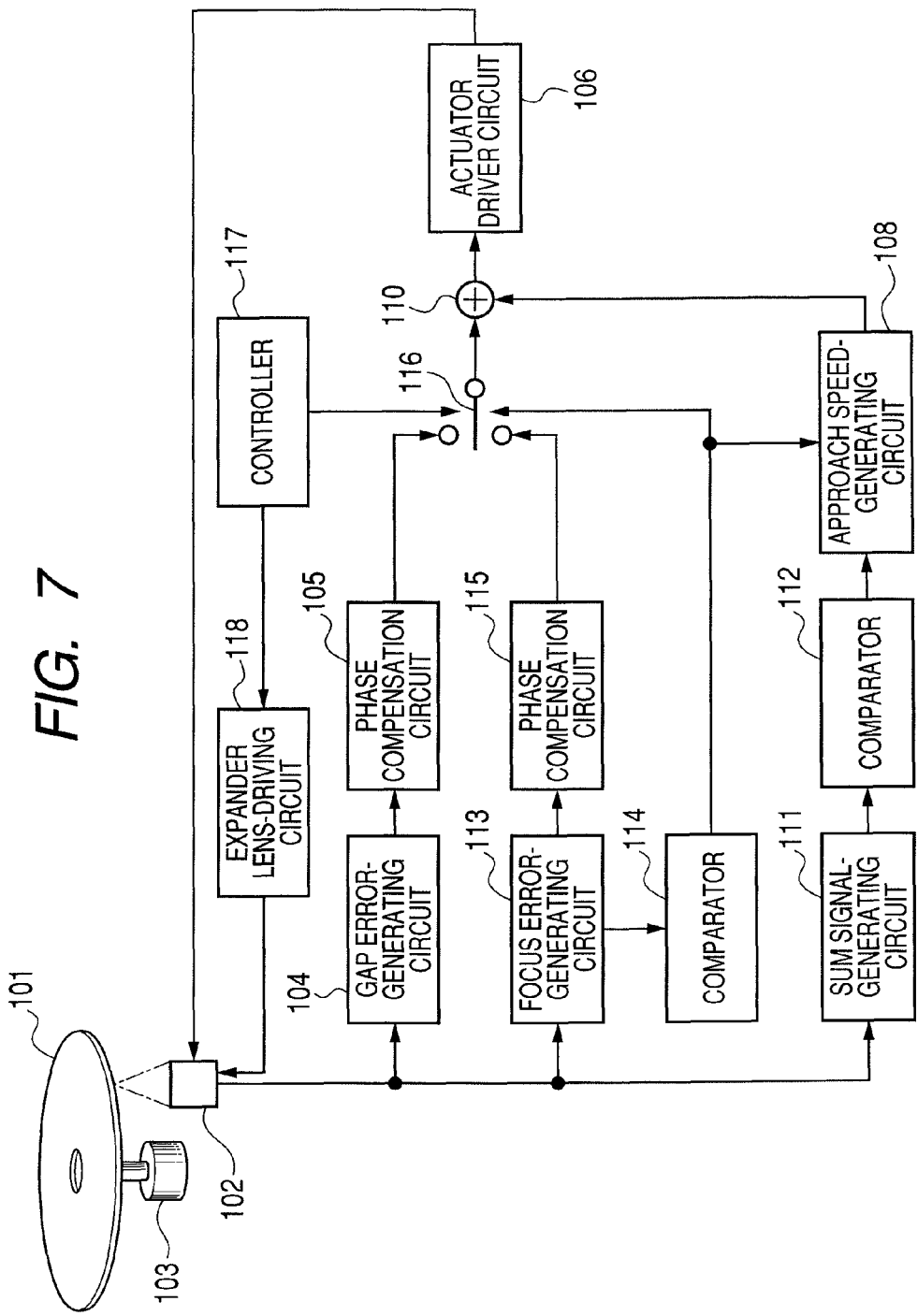
FIG. 7 is a block diagram of a Second Embodiment of the optical information recording-reproduction apparatus of the present invention.
Figure 8:
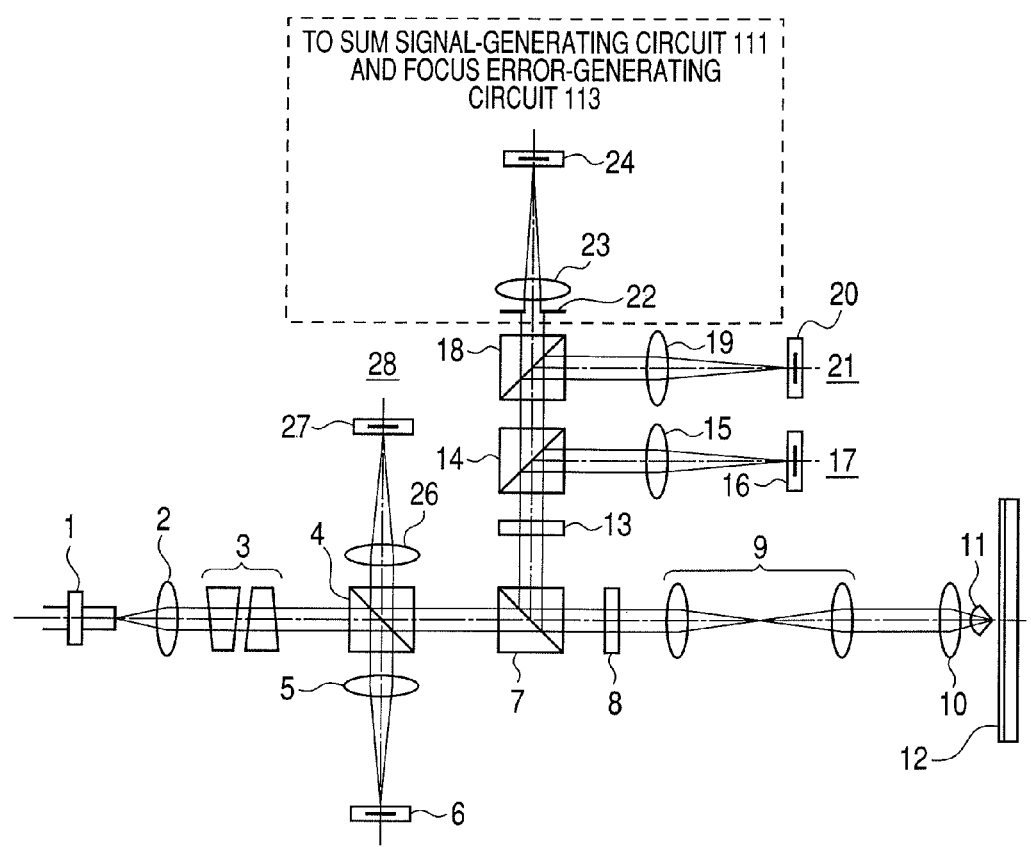
FIG. 8 illustrates a constitution of the optical pickup system of the Second Embodiment of the present invention.

FIG. 7 is a block diagram for a Second Embodiment of the present invention. In FIG. 7, the same symbols are used as in FIG. 1 for denoting corresponding members and items. FIG. 8 illustrates a constitution of the optical system (optical pickup) of this Embodiment. In FIG. 8, the same symbols are used as in FIG. 2 for denoting corresponding members. This Second Embodiment is different from the First Embodiment in that a focus error signal is generated together with a sum signal from the output from photodetector (PD4) 24, which receives the light beam of NA<1. Optical disk 101, in FIG. 7, corresponds to optical disk 12 in FIG. 8.

Focus error-generating circuit 113 detects a focus error signal from the output from photodetector (PD4) 24. The focus error signal can be generated, for example, by use of a toric lens as sensor lens 23, and a four-division sensor as photodetector (PD4) 24, according to a conventional astigmatism method.

The light beam of NA<1 contains much reflected light from the recording layer of optical disk 101, enabling generation of the focus error signal precisely, even if the optical disk is multi-layered. The focus control is conducted by the focus error signal.

This focus control enables precise follow to a slight irregularity in the thickness of the cover layer and interlayer for recording and reproduction of information. Further, sum signal generated by the light beam of NA<1 enables the focus control to be stable in a short time.

Figure 9A:
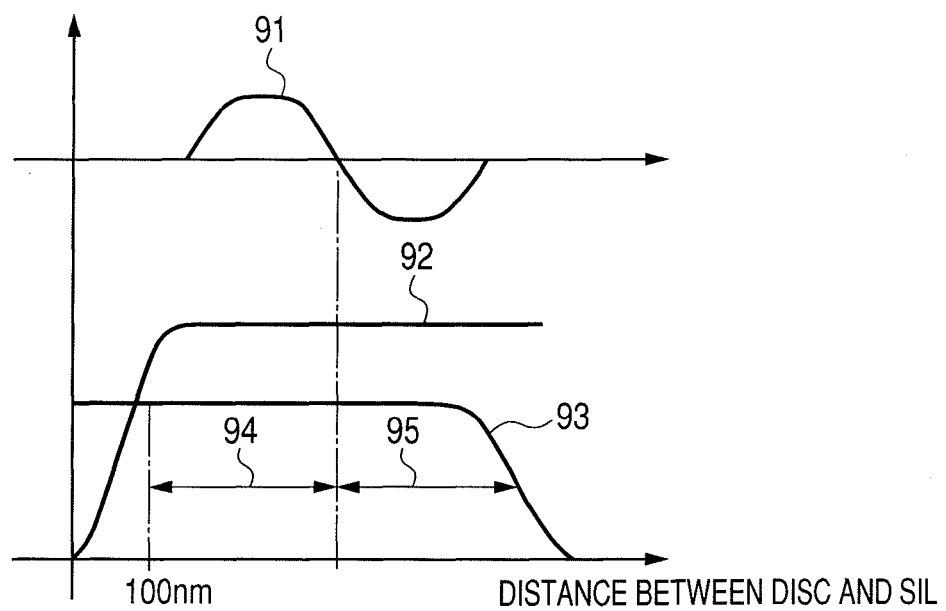
FIGS. 9A and 9B illustrate a gap error signal and a focus error signal in the Second Embodiment.

The focus control in this Embodiment is described below in detail with reference to FIGS. 7, 9A, 9B and 10. Before starting the focus control, controller 117 first controls expander lens-driving circuit 118, controlling expander lens 9 in optical pickup 102, to obtain the focus error signal and the gap error signal generated by the light beam of NA<1 in a state as illustrated in FIG. 9A. FIG. 9A shows focus error signal 91, gap error signal 92, and sum signal 93 from photodetector (PD4) 24, as functions of the distance of SIL from the optical disk.

In a near field state, the focusing error signal controls the focusing at a position of the SIL at a distance of about 1 μm from the optical disk, where the gap error signal level begins to lower (100 nm or less in FIG. 9A), as indicated by arrow marks 94, 95. The focusing point of the focusing error signal is adjusted by the lens interval in expander lens system 9, as shown in FIG. 8.

In the state illustrated in FIG. 9A, the focus control is started. First, according to a ramp-shaped driving signal output from approach speed-generating circuit 108, objective lens 10 and SIL 11 is driven to approach optical disk 101. During the approach, the aforementioned sum signal derived from the light beam of NA<1 is introduced to comparator 112.

Figure 10:
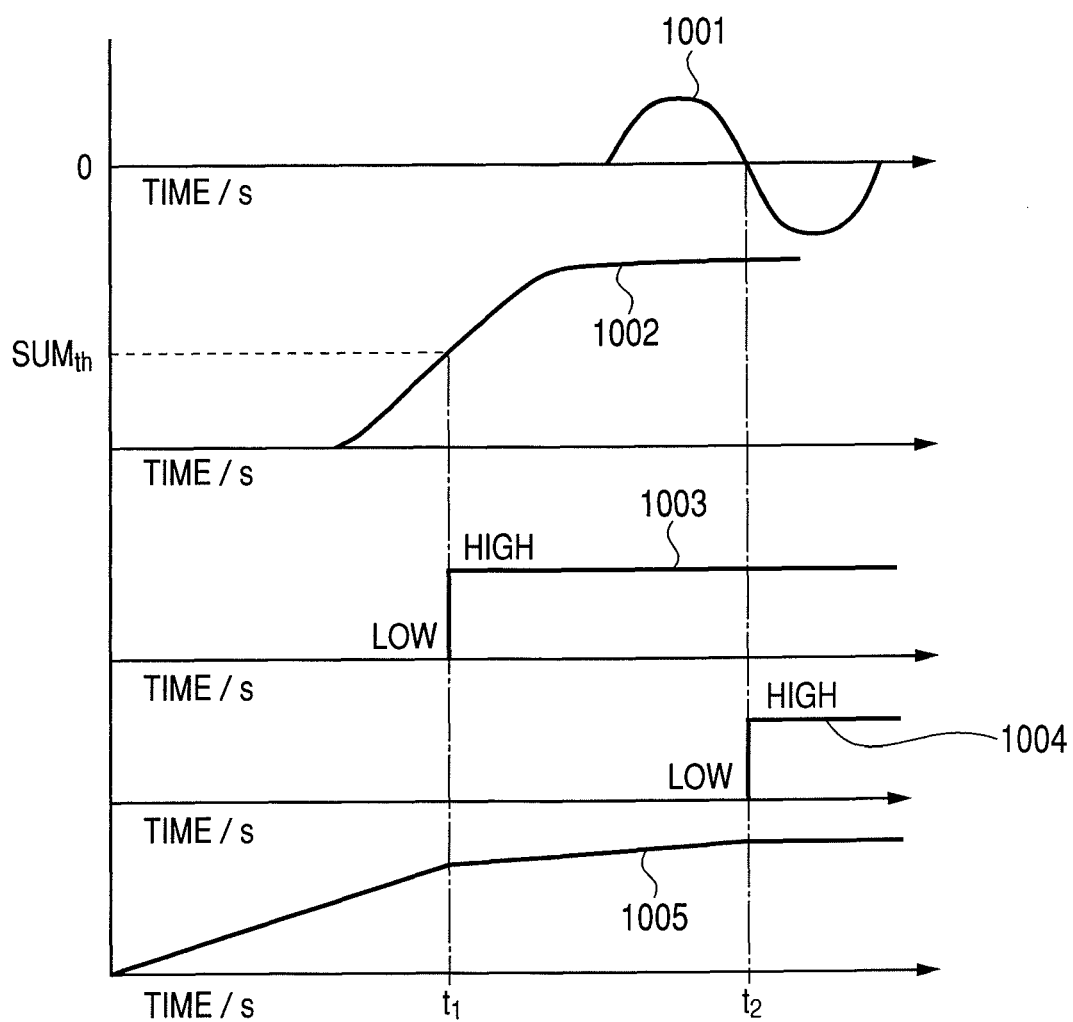
FIG. 10 is a timing chart for starting the servo-control of the gap in the Second Embodiment.
Figure 11:
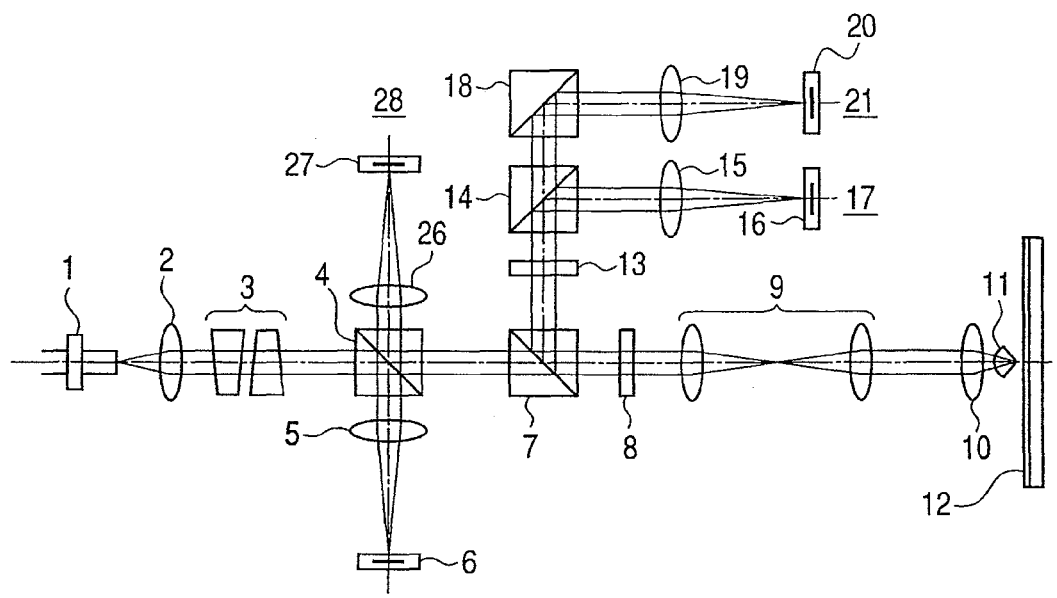
FIG. 11 illustrates a conventional optical system of an optical recording-reproduction apparatus for near-field recording.
Figure 12:
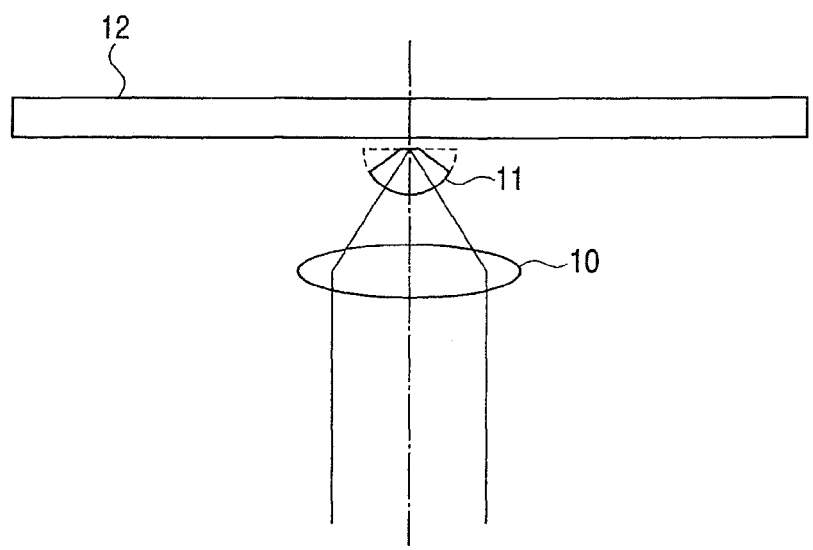
FIG. 12 is a drawing for describing a hemisphere SIL.

When the level of sum signal 1002 becomes higher than the prescribed level SUMth, as shown in FIG. 10, the output 1003 of comparator 112 is switched from the LOW level to the HIGH level. At the time when output 1003 of comparator 112 is switched to the HIGH level (the time of t1 in FIG. 10), approach speed-generating circuit 108 lowers the approach speed of objective lens 10 and SIL 11.

With the driving signal in a form of a ramp function, the approach speed can be lowered by decreasing the gradient. The approach movement is further continued at the lowered approach speed. During the approach movement, focus error signal 1001 is input steadily from focus error-generating circuit 113 to comparator 114. At the time when the zero-cross point of the focus error signal is detected, output level 1004 from comparator 114 is switched from LOW to HIGH (time t2 in FIG. 10).

On detection of the zero-cross point of the focus error signal, output signal 1005 from approach speed-generating circuit 108 is fixed at the level at the time t2, and, simultaneously, switch 116 is turned to select phase competition circuit 115 to start the servo-control of the focus.

In this state, the focus error signal is transmitted through phase compensation circuit 115, switch 116, and adder 110 to actuator driver 106. The use of the sum signal derived from the light beam of NA<1 enables high-speed approach before the time t1, as shown in FIG. 10.

The decrease of the approach speed after the time t1 prevents collision of the objective lens and SIL against the optical disk during the focus control. Further, the focusing is conducted at a distance of more than 1 µm between the SIL and the optical disk by expander lens system 9, to lower further the probability of collision of the SIL against the optical disk.

As described above, in the focus control also, the sum signal derived from the light beam of NA<1 is utilized for stable focusing in a short time. Controller 117, having detected normal completion of the focus control, switches the SIL focusing from focus control to gap servo-control by a gap error signal.

Figure 9B:
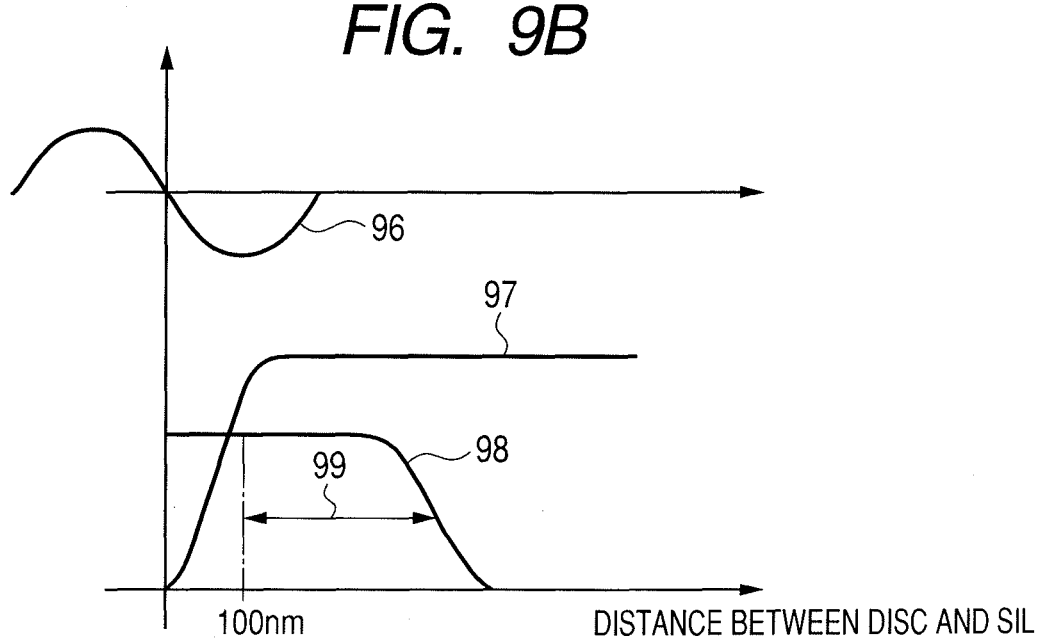

Specifically, when the sum signal has been kept at a level higher than a prescribed level for a prescribed time or longer after the time t2 in FIG. 10, the focus control is judged to have been conducted normally. Then, controller 117 controls expander-driving circuit 118 to change the focusing from the state shown in FIG. 9A to another state shown in FIG. 9B (focusing in the near field region), to drive expander lens system 9 in optical pickup. In FIG. 9B, curves 96, 97, and 98 respectively represent the FE signal, the gap error signal, and the sum signal. Arrow mark 99 indicates the range in which the distance between the SIL and the disk is about 1 µm.

After the drive of expander lens system 9 is completed and the gap error signal comes to be below a prescribed level, controller 117 turns switch 116 to select phase compensation circuit 105, to change the focusing control to gap servo-control In this state, information is recorded on optical disk 101 or reproduced therefrom.

As described above, in servo-control of the focus with the focus error signal generated by the light beam of NA<1, the focusing to the recording layer of the optical disk can be controlled stably, by utilizing the sum signal derived from the light beam of NA<1.

As described above, according to the present invention, servo-control is conducted stably in a short time, without collision of SIL against the optical recording medium, by utilizing a sum signal derived from the light beam corresponding to an effective aperture number of less than one.

While the present invention has been described with reference to exemplary embodiments, it is to be understood that the invention is not limited to the disclosed exemplary embodiments. The scope of the following claims is to be accorded the broadest interpretation, so as to encompass all such modifications and equivalent structures and functions.

What is claimed is:

1. An optical information recording-reproducing apparatus for effecting at least one of recording of information on and reproducing of information from an optical recording medium, said apparatus comprising:
    a light source for emitting a light beam;
    an objective lens and a solid immersion lens for receiving the light beam from the light source and for approaching the optical recording medium at a predetermined speed to focus the light beam onto the optical recording medium;
    an aperture element for collecting a portion of the light beam that is reflected by the recording medium, the portion of the light beam having a diameter that corresponds to an effective aperture number of the objective lens and the solid immersion lens of less than one;
    a detecting element for detecting the portion of the light beam collected by the aperture element and for producing an output signal;
    a speed-generating circuit for receiving the output signal from the detecting element and for determining the speed of approach of the solid immersion lens to the recording medium, in accordance with the output signal, and for producing an output; and
    a driver circuit for driving the objective lens and the solid immersion lens and for reducing the speed of approach of the solid immersion lens, in accordance with the output from the speed-generating circuit.

2. The optical information recording-reproducing apparatus according to claim 1, further comprising a servo-control circuit for producing an output to the driver circuit to control a gap between the solid immersion lens and the recording medium.

3. The optical information recording-reproducing apparatus according to claim 1, further comprising a reflected light detecting element for detecting the light beam reflected by the recording medium and for producing an output signal.

4. The optical information recording-reproducing apparatus according to claim 3, further comprising a gap error-generating circuit for receiving the output signal from the reflected light detecting element to determine whether the value of that signal differs from a predetermined threshold and for generating a corresponding gap error signal.

5. The optical information recording-reproducing apparatus according to claim 4, further comprising a servo-control circuit for receiving the gap error signal from the gap error-generating circuit and for producing a corresponding servo-control output.

6. The optical information recording-reproducing apparatus according to claim 5, wherein the driver circuit receives the servo-control output and controls a gap between the solid immersion lens and the recoding medium by driving the objective lens and the solid immersion lens in accordance with the corresponding servo-control output.

7. The optical information recording-reproducing apparatus according to claim 6, wherein the driver circuit begins controlling the gap after the driver circuit begins reducing the speed of approach of the solid immersion lens to the recording medium.

8. The optical information recording-reproducing apparatus according to claim 7, wherein the apparatus effects the at least one of recording of information on and reproducing of information from the recording medium once the driver circuit begins controlling the gap.

9. The optical information recoding-reproducing apparatus according to claim 1, further comprising a focus servo-control circuit for producing an output to the driver circuit to control the focus of the light beam onto the recording medium.

10. The optical information recoding-reproducing apparatus according to claim 9, further comprising a second servo-control circuit for producing an output to the driver circuit to control a gap between the solid immersion lens and the recording medium.

11. The optical information recording-reproducing apparatus according to claim 1, further comprising a focus error-generating circuit for receiving the output signal from the detecting element to determine whether the value of the output signal differs from a predetermined threshold and for generating a corresponding focus error signal.

12. The optical information recording-reproducing apparatus according to claim 11, further comprising a focus servo-control circuit for receiving the focus error signal from the focus error-generating circuit and for producing a corresponding focus output.

13. The optical information recording-reproducing apparatus according to claim 12, wherein the driver circuit receives the focus output and controls the focus of the light beam onto the recording medium by driving the objective lens and the solid immersion lens in accordance with the corresponding focus output.

14. The optical information recording-reproducing apparatus according to claim 13, wherein the driver circuit begins controlling the focus after the driver circuit begins reducing the speed of approach of the solid immersion lens to the recording medium.

15. The optical information recording-reproducing apparatus according to claim 13, further comprising a reflected light detecting element for detecting the light beam reflected by the recording medium and for producing an output signal.

16. The optical information recording-reproducing apparatus according to claim 13, further comprising a gap error-generating circuit for receiving the output signal from the reflected light detecting element to determine whether the value of that signal differs from a predetermined threshold and for generating a corresponding gap error signal.

17. The optical information recording-reproducing apparatus according to claim 16, further comprising a second servo-control circuit for receiving the gap error signal from the gap error-generating circuit and for producing a corresponding servo-control output.

18. The optical information recording-reproducing apparatus according to claim 17, wherein the driver circuit receives the servo-control output and controls a gap between the solid immersion lens and the recording medium by driving the objective lens and the solid immersion lens in accordance with the corresponding servo-control output.

19. The optical information recording-reproducing apparatus according to claim 18, wherein the driver circuit begins controlling the focus after the driver circuit begins reducing the speed of approach of the solid immersion lens to the recording medium.

20. The optical information recording-reproducing apparatus according to claim 19, wherein the driver circuit completes the controlling of the focus upon receipt of a focus output from the focus servo-control circuit that corresponds to a null focus error signal.

21. The optical information recording-reproducing apparatus according to claim 20, wherein the driver circuit begins controlling the gap after the driver circuit completes the controlling of the focus.

22. The optical information recording-reproducing apparatus according to claim 21, wherein the apparatus effects the at least one of recording of information on and reproducing of information from the recording medium once the driver circuit begins controlling the gap.

* * * * *